G. G. BARRY.
RIM FOR VEHICLE TIRES.
APPLICATION FILED JAN. 3, 1921.
1,425,826. Patented Aug. 15, 1922.
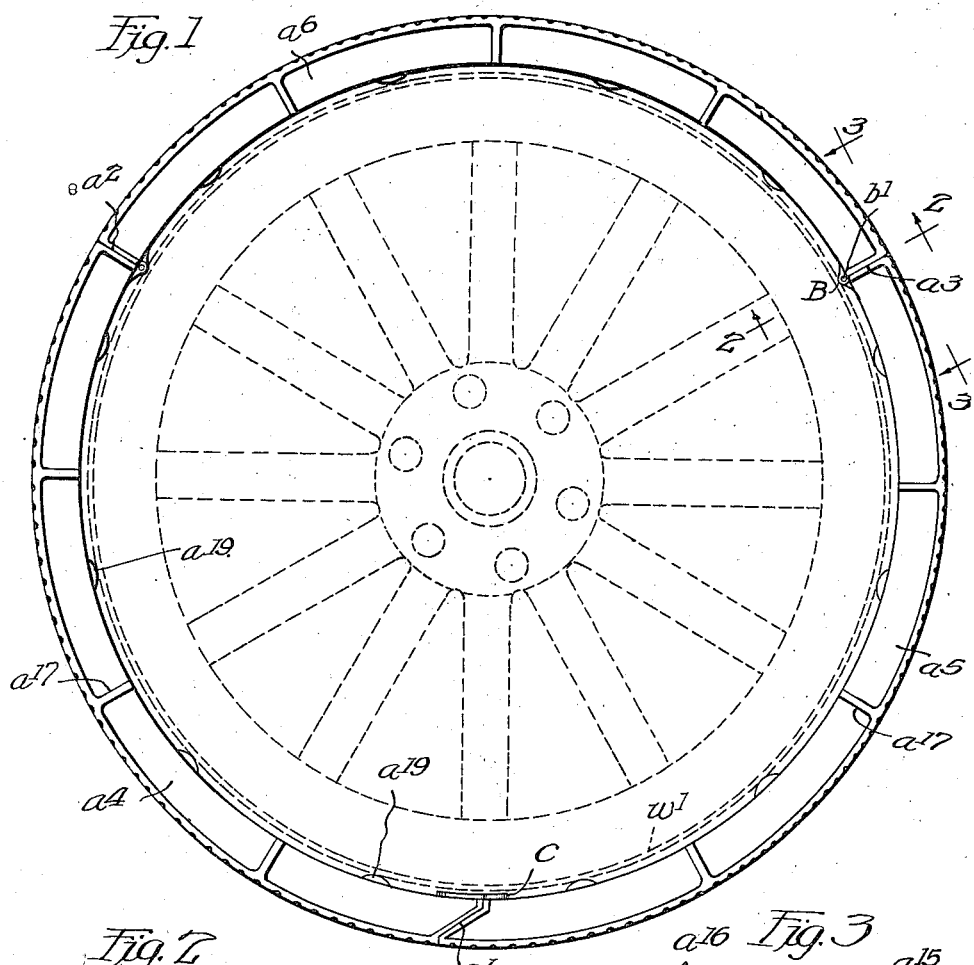
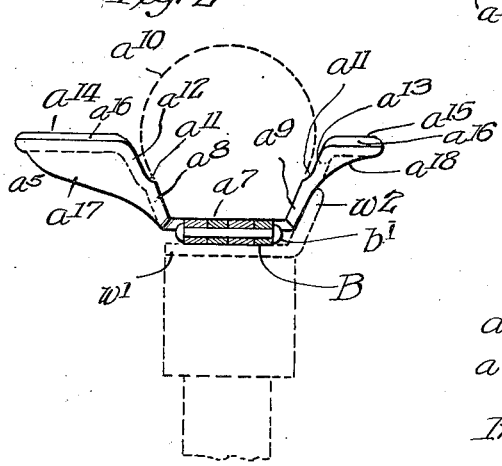
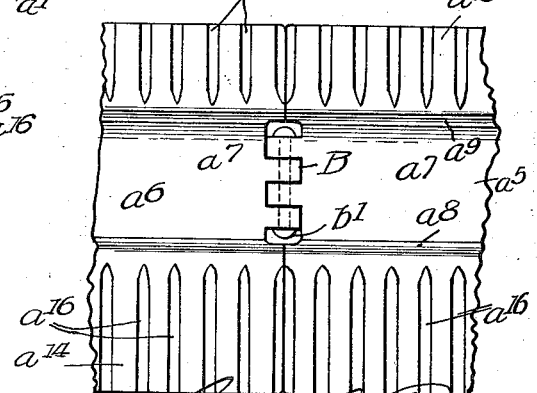
Inventor
Gerald G. Barry

UNITED STATES PATENT OFFICE.

GERALD G. BARRY, OF CHICAGO, ILLINOIS.

RIM FOR VEHICLE TIRES.

1,425,826.   Specification of Letters Patent.   Patented Aug. 15, 1922.

Application filed January 3, 1921. Serial No. 434,521.

*To all whom it may concern:*

Be it known that I, GERALD G. BARRY, a citizen of the United States, and a resident of Chicago, in the county of Cook and State of Illinois, have invented certain new and useful Improvements in Rims for Vehicle Tires, of which invention the following is a specification.

This new article is intended more particularly for use on mud roads or soft ground, and embodies an improvement on the rim shown in my Patent No. 1,358,923, having an additional integral "traction flange" on opposite sides of the tire, which is brought into use when the tire sinks and traction cannot be obtained with the ordinary tire. As will be noticed, the additional flanges combined with the ordinary tire and carrying rim provides a wheel having a very wide traction surface and is adapted to be driven over roads on which wheels with the ordinary tires practically could not be operated.

Further objects of the invention are to provide a rim for the purpose which is simple and low in cost, requires no changes in the established tire and wheel elements, and is adapted to be readily positioned or withdrawn from operative mounted relation with the wheel structure and the tire carried thereby. Manufacturers and users of rims will readily appreciate the advantages of the improvements provided by the present invention from a consideration of the description of same in this specification, together with the accompanying drawing forming a part of the specification.

Referring to the drawings, Fig. 1 is a side elevation, showing the new rim in mounted position, the outline of the wheel body on which the rim is demountably secured being dotted in, the rubber tire to be carried, however, not being shown in this figure. Fig. 2 is a transverse section taken on the line 2—2 of Fig. 1; and Fig. 3 is a detail plan view taken of the surface between the points 3—3 of Fig. 1.

The present invention, like my Patent No. 1,358,923, provides a demountable tire carrying rim, having the added features for giving traction on mud roads, which is subdivided into a plurality of sections, but the sectionizing now is not only for the purpose of facilitating the positioning or removal of the tire, but in the present rim is practically a necessity, as the preferred form of this rim is such that otherwise the tire could not be mounted thereon.

Referring to the drawings now more in detail, Fig. 1 illustrates the new rim structure to be sectionized into three substantially equal portions of the annulus, and instead of this being only one transverse parting slit, such as marked here at $a^1$, provided with a detachable locking means, there are two additional transverse slits parting the rim, as indicated at $a^2$ and $a^3$, the three sections of the rim being here marked $a^4$, $a^5$ and $a^6$. At these two additional partings $a^2$ and $a^3$, a suitable hinge means, element B, is provided, uniting the adjoining sections of the rim, and the ends at the remaining parting $a^1$ are detachably secured by a suitable locking device, element C.

The hinges B are connected to or form an integral part of the base band portion $a^7$ of the rim, Fig. 3 showing integral intermeshing pintle encircling fingers on the adjacent base band ends, $b^1$ marking the pintle, the end after inserting being swedged to prevent same coming out.

The side flanges $a^8$ and $a^9$ which project outwardly from the base band and embrace the tire seats, and also the additional traction flanges, are simply cut through but normally tightly abut each other, and the abutting surface of these flanges at said partings is preferably increased by flaring the same. It will be apparent that when the section ends at the parting $a^1$ have been unlocked, instead of being merely capable of being sprung apart from the normal abutment, the ends may be swung free and clear, the section $a^4$ swinging inwardly on the hinge at $a^2$ and the section $a^5$ then swinging in on the hinge at the parting $a^3$; and that when these two sections have been folded up, the distance across from $a^2$ to $a^3$, embraced by the remaining section $a^6$, being less than the inside diameter of the tire, section $a^6$ may be freely placed or withdrawn. In first positioning the rim within the tire, the rim structure is collapsed, the section $a^6$ placed to embrace its circumferential portion of the tire seats, then the section $a^5$ and next $a^4$ are swung outwardly to embracing engagement with their respective portions of the tire and secured by the locking element C. In removing the rim from the tire, the order of operations is reversed, of course. Obviously, the rim and tire are demounted from the wheel when such collapsing and positioning operations are performed.

The parting slit through the side flanges at $a^2$ and $a^3$ I prefer to have provided on a radius line of the rim, the adjacent surfaces to normally tightly abut as shown, but at the parting $a^1$, however, I prefer to vary the transverse parting through the side flanges from one on a true radius line of the rim, as shown at $a^2$ and $a^3$, to a more irregular one, as indicated at the parting line $a^1$ of Fig. 1, where the junction line through the side flanges is shown on a more oblique angle. This may recede and be cut straight at the base band and also at the outer edge, so that the adjacent ends of the base band and flanges have abutting engagement, with section $a^4$ resting on and supported by section $a^5$, and thus, with the flanged surfaces of the abutting contacts of the sections at $a^2$ and $a^3$, there can be no outward yielding without forcibly springing the rim, which is practically impossible, especially when the tire is on the rim, and yet when the suitable locking means C is operated it will be obvious the more oblique line of the parting at $a^1$ makes the operation of positioning or removing the rim from the tire much easier than if this parting at $a^1$ was on a straight line the same as at $a^2$ and $a^3$.

Referring to Fig. 2, the dotted circular line $a^{10}$ gives about the relative outline of an ordinary pneumatic tire, and $a^{11}$ marks about the top point of the side flanges $a^8$ and $a^9$ in contact with the casing side on an ordinary standard rim.

The present invention, however, is embodied more particularly in the additional features now to be described, whereby former rim structures are modified or altered by the combination therewith of additional metal traction securing means.

Above the top point or ordinary outer edge of the tire carrying rim, marked $a^{11}$, it will be observed there is a more liberal space between the tire and the additional flange elements of the new improvement, the casing wall being free to yield outwardly without here coming against the flange sides. This is true whether the form of the rim and the tire carried thereby is of the "clincher" type or "straight side" type, here shown; and I contemplate using either type. The new feature is integrally connected to the ordinary side flanges $a^8$ and $a^9$, at the normal edge thereof, and comprises integral outwardly directed continuations $a^{12}$ and $a^{13}$ of these flanges $a^8$ and $a^9$ beyond the customary limit $a^{11}$ thereof, for the present purpose being now preferably carried to about the center of the tire, and then there continues substantially at right angles to the plane of the wheel further "traction" flanges on each side, marked $a^{14}$ and $a^{15}$ respectively.

We have already noticed that above the ordinary limit $a^{11}$ of the side flanges the new additional flanges $a^{12}$ and $a^{13}$ recede a greater distance from the casing wall $a^{10}$ and between same and the wall $a^{10}$ there is normally a free space into which the tire may yield under normal operations. When the tire is traveling over a hard road the ordinary pneumatic action of the rubber tire may be realized, that is, only the tread of the pneumatic tire will come into contact with the road surface and the additional metal "traction flanges" of the rim structure are held free from the road. Upon coming into bad, muddy roads, however, or say when it becomes desirable to leave the road and drive into softer ground, into which the ordinary tire $a^{10}$ would sink, and on the rear wheels when driven by the engine would simply spin and cut deeper into the mud, now the new metal traction flanges $a^{14}$ and $a^{15}$, on opposite sides of the tire, are brought into play. The relatively narrow tire $a^{10}$ can sink a few inches and then we come to rest on and have the supplemental aid of the wide metal tread, the benefits of which will be obvious.

The new flanges are provided on the surface with ridges or fluting, marked $a^{16}$, similar to ordinary metal tractor wheels. I also provide a series of reinforcing braces $a^{17}$ and $a^{18}$. I prefer to make the flange $a^{15}$ narrower than $a^{14}$ and mount the rim so that the narrow flange will come on the inside of the wheel and thus be more free from the car frame etc. And also the braces $a^{18}$ supporting the flange $a^{15}$ are made to clear the top edge of the usual flange stop $w^2$ on the wheel felly band $w^1$, on which the rim is mounted. $a^{19}$ indicates customary bosses or ribs on the bottom of the rim base band $a^7$, intended to permit the rim to be placed or freed more easily than if the base band $a^7$ and felly band $w^1$ were in entire surface contact.

In the foregoing I have described the invention in its preferred embodiment, but it will be obvious that various changes may be made in the construction without departing from the spirit and scope of the invention. For example, while it was devised primarily for use with pneumatic tires, and has been described in this connection, it may also be used to advantage to supplement the traction of rims carrying solid rubber tires. I do not, therefore, wish any undue limitation to result from the detailed description given herein, but desire the claims appended hereto to be construed as broadly as possible in view of the prior art relating to rims.

Having described my invention, what I claim as new and desire to secure by Letters Patent is the following:

1. As a new article of manufacture, a demountable rim for vehicle tires comprising an annular band provided with a flange on each side thereof for embracing the tire seats and securing the same, and integrally connected to each of the said side flanges a further flange which is outwardly directed and recedes from normal surface contact with the tire wall, being so carried outwardly beyond the customary limit of the tire seat embracing flanges to substantially one-half the sectional depth of the tire, and then the said additional flange being turned and continuing substantially at right angles to the plane of the wheel, the said base band and side flanges being split transversely at a plurality of points of the circumference, at one of said parting splits suitable locking means for there detachably securing the adjoining sections of the rim, and at the remaining partings suitable hinges connecting adjoining sections of the rim and adapted to permit inward movement thereof, substantially as set forth.

2. As a new article of manufacture, a rim of the character described comprising in combination the annular base band $a^7$, tire seat embracing flanges $a^8$ and $a^9$, the flaring integrally connected flange continuations $a^{12}$ and $a^{13}$, and the further "traction" flange continuations $a^{14}$ and $a^{15}$, all substantially as and for the purposes set forth.

3. As a new article of manufacture, a rim of the character described comprising in combination the annular base band $a^7$, the tire seat embracing flanges $a^8$ and $a^9$, a flaring integrally connected continuation of a tire seat embracing flange and a further "traction" flange continuation, substantially as and for the purposes set forth.

4. In a tire carrying rim of the character described, having an annular base band provided with a flange on each side thereof for embracing the tire seats, the said base band and side embracing flanges being split transversely at a plurality of points of the circumference, an additional annular flange, subdivided into a like plurality of sections, normally held out of contact with the road surface but adapted to furnish supplemental tractor surface, the sections of the said additional annular flange being integrally connected to the corresponding sections of the tire seat embracing flange, substantially as set forth.

In testimony whereof, I have hereunto signed my name to this specification.

GERALD G. BARRY.